United States Patent [19]

Sudo et al.

[11] Patent Number: 5,778,314

[45] Date of Patent: Jul. 7, 1998

[54] SPEECH MESSAGE RECORDING AND REPRODUCING METHOD AND APPARATUS

[75] Inventors: Shigeyuki Sudo, Fujisawa; Yasuaki Takahara, Yokohama; Toru Tanaka, Fujisawa, all of Japan

[73] Assignee: Hitachi, Ltd., Tokyo, Japan

[21] Appl. No.: 518,975

[22] Filed: Aug. 24, 1995

[30] Foreign Application Priority Data

Aug. 26, 1994 [JP] Japan .................... 6-202167

[51] Int. Cl.⁶ .............. H04Q 7/20; H04Q 7/30; H04Q 7/32

[52] U.S. Cl. .............. 455/412; 455/413; 455/564; 379/355

[58] Field of Search ............... 379/58, 61, 355, 379/356, 357, 100, 89, 67, 88, 62; 358/402, 434, 440; 455/412, 413, 426, 556, 557, 564, 575, 90

[56] References Cited

U.S. PATENT DOCUMENTS

| | | | |
|---|---|---|---|
| 4,304,968 | 12/1981 | Klausner et al. | 379/67 |
| 4,897,865 | 1/1990 | Canuel | 379/357 |
| 4,907,264 | 3/1990 | Seiler et al. | 379/355 |
| 4,975,948 | 12/1990 | Andresen et al. | 379/355 |
| 5,144,654 | 9/1992 | Kelley et al. | 379/356 |
| 5,220,594 | 6/1993 | Ohnishi et al. | 379/61 |
| 5,426,511 | 6/1995 | Nagatomo | 358/402 |
| 5,426,594 | 6/1995 | Wright et al. | 358/402 X |
| 5,459,584 | 10/1995 | Gordon et al. | 358/434 |
| 5,479,411 | 12/1995 | Klein | 358/402 X |
| 5,509,050 | 4/1996 | Berland | 379/58 |

FOREIGN PATENT DOCUMENTS

| | | |
|---|---|---|
| 5-227347 | 9/1993 | Japan . |
| 5-300293 | 11/1993 | Japan . |
| 5-300294 | 11/1993 | Japan . |
| 5-300359 | 11/1993 | Japan . |
| 2169475 | 7/1986 | United Kingdom ......... 379/357 |

Primary Examiner—Dwayne Bost
Assistant Examiner—Nay Maung
Attorney, Agent, or Firm—Antonelli, Terry, Stout, & Kraus, LLP

[57] ABSTRACT

A speech message recording and reproducing method and apparatus wherein a speech message associated with a facsimile transmission is stored in a communication apparatus having an automatic answering telephone apparatus associated with a facsimile apparatus. Information of the speech apparatus including at least a storage address thereof is converted to an optical pattern for printing on a recording paper. The printed optical pattern is optically detected, interpreted and transmitted by radio communication to the communication apparatus and the speech message stored at the storage address is reproduced. The optical pattern is read by a reader forming part of a portable telephone unit.

15 Claims, 9 Drawing Sheets ns 5,778,314

SPEECH MESSAGE RECORDING AND REPRODUCING METHOD AND APPARATUS

The present invention relates to a method of recording/reproducing of a transmitted speech message associated with a facsimile document and a communication apparatus for use in such a method and, more particularly, to a speech message recording/reproducing method with simplified operation and security of privacy at speech message reproduction and a communication apparatus for use in such a method.

BACKGROUND OF THE INVENTION

In image transmission using a facsimile communication apparatus, it is a frequent practice to supplement, by voice call, image information sent by facsimile or to notify a receiving party of transmission of a facsimile document. It is, however, undesirable to separately perform these two communication operations, image transmission and voice call, because such a practice increases communication cost and involves complicated operation.

With the above-mentioned problems taken into consideration, a voice contact reservation capability for a facsimile communication apparatus has been developed. This capability switches the same telephone line from image transmission mode to speech mode upon termination of image transmission without disconnecting the circuit. This capability assumes that the receiving side is attended by an operator for responding to the voice communication.

The receiving side may however be unattended. In such a case, the speech message is recorded on an automatic answering telephone. However, the standard facsimile communication protocol does not specify a procedure for recording a speech message on the automatic answering telephone (this recording is also called registration hereinafter) after image transmission, thereby requiring a unique idea for operatively linking the voice contact reservation capability with the automatic answering telephone capability.

For example, Japanese Non-examined Patent Publication No. 5-300359 discloses an apparatus having an automatic call terminating section for detecting a conversation request signal sent from a sender to perform an automatic off-hook operation after a predetermined number of rings, thereby recording the speech message automatically. Japanese Non-examined Patent Publication No. 5-227347 discloses an apparatus having a dial-tone recognizing unit for controlling circuit switching by a tone signal wherein the circuit switching is switched to the registration mode.

In the above-mentioned two disclosures, facsimile transmission is performed prior to speech message recording. A oppositely operating apparatus has also been proposed in which the facsimile receive operation follows speech message recording. Japanese Non-examined Patent Publication No. 5-300294 discloses that the start and end of a speech message are notified by means of tone signals, upon which facsimile transmission is performed. Japanese Non-examined Patent Publication No. 5-300293 discloses an apparatus for detecting a no-signal state beyond a predetermined time interval to switch to facsimile transmission.

The above-mentioned disclosed technologies and the like make it possible for the automatic answering telephone capability to be linked with facsimile transmission, thereby associating image data with speech message data for integrated handling of both.

For example, in one of the above-mentioned publications, a plurality of pieces of image data and speech data are received and stored to be displayed, in a list form, on an LCD panel attached to the facsimile communication apparatus. At reproduction, an image specified by an operator is displayed and then a speech message associated with the displayed image is outputted from the speaker (Japanese Non-examined Patent Publication No. 5-300293).

This publication also discloses, in another embodiment, a case in which image data is not stored in memory but outputted directly to a printer. If speech data is attached to the image data, the fact of the attachment and the storage number of the speech data are printed on the paper. The operator enters the number to obtain reproduction of the speech message from the speaker.

Recently, the facsimile communication apparatus has been increasingly reduced in size and price, and is being used in an increasing number of families. In household applications, contents of communication are mostly personal information, thus requiring confidentiality of communication compared with an office application. Also, a household application is characterized more by entertainment such as the sending of a birthday card along with a speech message than merely retrieving information. In such an application, repeated reproduction is assumed.

In the above-mentioned disclosure, speech data reproduction is restricted to the speaker of the facsimile apparatus. To listen to a speech message confidentially and separately from other members of the family, a facsimile machine dedicated to each family member needs to be installed, which increases installation cost. Also, to listen to a speech message, each addressee is required to go to the facsimile installed location, thereby reducing the convenience of operation. Moreover, with respect to the necessity of repeated reproduction or an operation by a child, most conventional facsimile apparatuses are insufficient in providing a simple, easy-to-use family user interface.

SUMMARY OF THE INVENTION

It is therefore an object of the present invention to provide a speech message recording/reproducing method and a communication apparatus for the method which are suitable especially for a household application with confidentiality at reproducing the message ensured and a repetitive reproducing operation simplified.

In carrying out the invention and according to one aspect thereof, there is provided a communication apparatus comprising:

a facsimile communication unit for outputting received image data and other communication data;

a first handset having a transmitter microphone and a receiver speaker;

a speech data storage unit for storing an audio signal or coded speech data according to specified address information, the stored information being outputted for any specified address;

a circuit connecting unit for accepting operator entered data, distributing the operator entered data to peripheral units as required, performing calling and call-incoming control on a network, having a transmitter path and a receiver path for the audio signal, connecting the handset to both the paths, and selecting the facsimile communication unit or one of the paths for connection to the network;

a first radio communication unit for communicating a first audio signal passing the path connected to the network, a second audio signal or speech data outputted from the speech data storage unit, and other communication data with an apparatus located at the other end of a radio path;

a control unit for receiving communication data coming from the facsimile communication unit and communication data coming from the apparatus located at the other end of the radio path via the first radio communication unit, instructing the circuit connecting unit to perform a connection switching operation and a line disconnecting operation, setting an audio path for recording in automatic answering, and outputting recording or reproducing address information to the speech data storage unit;

an optical pattern data generation unit for receiving the address information, converting the received address information to optically readable facsimile print data, and outputting the converted data; and an image recording unit for receiving the data coming from the optical pattern data generation unit and the image data coming from the facsimile communication unit and printing both the data in a predetermined format;

wherein the facsimile communication unit, the first handset unit, the speech data storage unit, the circuit connecting unit, the first radio communication unit, the control unit, the optical pattern data generation unit, and the image recording unit constitute a base station arranged as connected with the network.

Further, at least one portable station unit powered by a battery is provided at the other end of the radio path to which the base station is connected, the portable station unit comprising:

a second handset, a second radio communication unit for transmitting and receiving the audio signal or the speech data and other communication data, and an optical reading unit connected to the second radio communication unit, the optical reading unit enabling detecting and interpreting of a printed optical pattern to convert the detected and interpreted pattern to communication data.

Now, it is assumed that the base station is set to the automatic answering mode by the operator through the circuit connecting unit. Then based on the operator data, the control unit also recognizes the automatic answering mode.

If a call terminates in the above-mentioned state, the circuit connecting unit detects the reception of a facsimile image to connect the signal of the network side to the facsimile communication unit. Then, if a voice contact is requested from the calling side by such operation as the voice contact reservation during the facsimile communication, the control unit detects the request from the communication data outputted by the facsimile communication unit and, following the procedure discontinuation processing for the termination of facsimile image transmission, instructs the circuit connecting unit to switch the connection to the audio path side.

Receiving the instruction, the circuit connecting unit sets the audio path. The control unit also outputs the address information (a) of an automatic answer message stored in the speech data storage unit in advance and, at the same time, instructs the network to set the audio path for transmitting the automatic answer message.

As a result, the calling operator can hear the above-mentioned answer message to know that the called side is in the automatic answering mode. Following the answer message, the calling operator sends his or her speech message.

This speech message is stored in the speech data storage unit via the audio path according to the address information (b) specified by the control unit. The address information (b) for recording is determined in the control unit when the voice contact reservation has been detected by means of the procedure discontinuation processing signal or the like at the latest. Consequently, the optical pattern data generation unit may convert and output print data based on the address information (b) immediately after reception of the facsimile image. When printing image data, the image recording unit attaches the address information in a predetermined format according to the print data. As a result, the facsimile image and the speech message can be recorded in an associated manner.

In reproducing the recorded speech message, the address information of the print output is detected and interpreted by the optical reading unit incorporated in the portable station unit to be converted to communication data. The communication data is sent by the second radio communication unit to the base station.

In the base station, the control unit receives the address information (b) via the first radio communication unit to recognize the instruction for reproducing the message. Then, the control unit instructs the audio path of the circuit connecting unit to output the audio signal or speech data outputted from the speech data storage unit to the first radio communication unit and, at the same time, outputs the received address information (b) to the speech data storage unit as the reproduction address.

The audio signal or speech data outputted from the speech data storage unit is transmitted from the first radio communication unit to the second radio communication unit to be outputted to the operator of the portable station unit via the handset.

Consequently, with printing paper and the portable station unit provided, a desired message can be retrieved without locational restriction as far as the base station and the portable station unit are within a radio transmittable area, thereby ensuring confidentiality of communication. Also, since message reproduction is activated by entering data in the optical reading unit of the portable station unit, the operation for message retrieval is simple and the repetitive reproduction of a message is easy.

DESCRIPTION OF THE PREFERRED EMBODIMENTS

Figure 1:
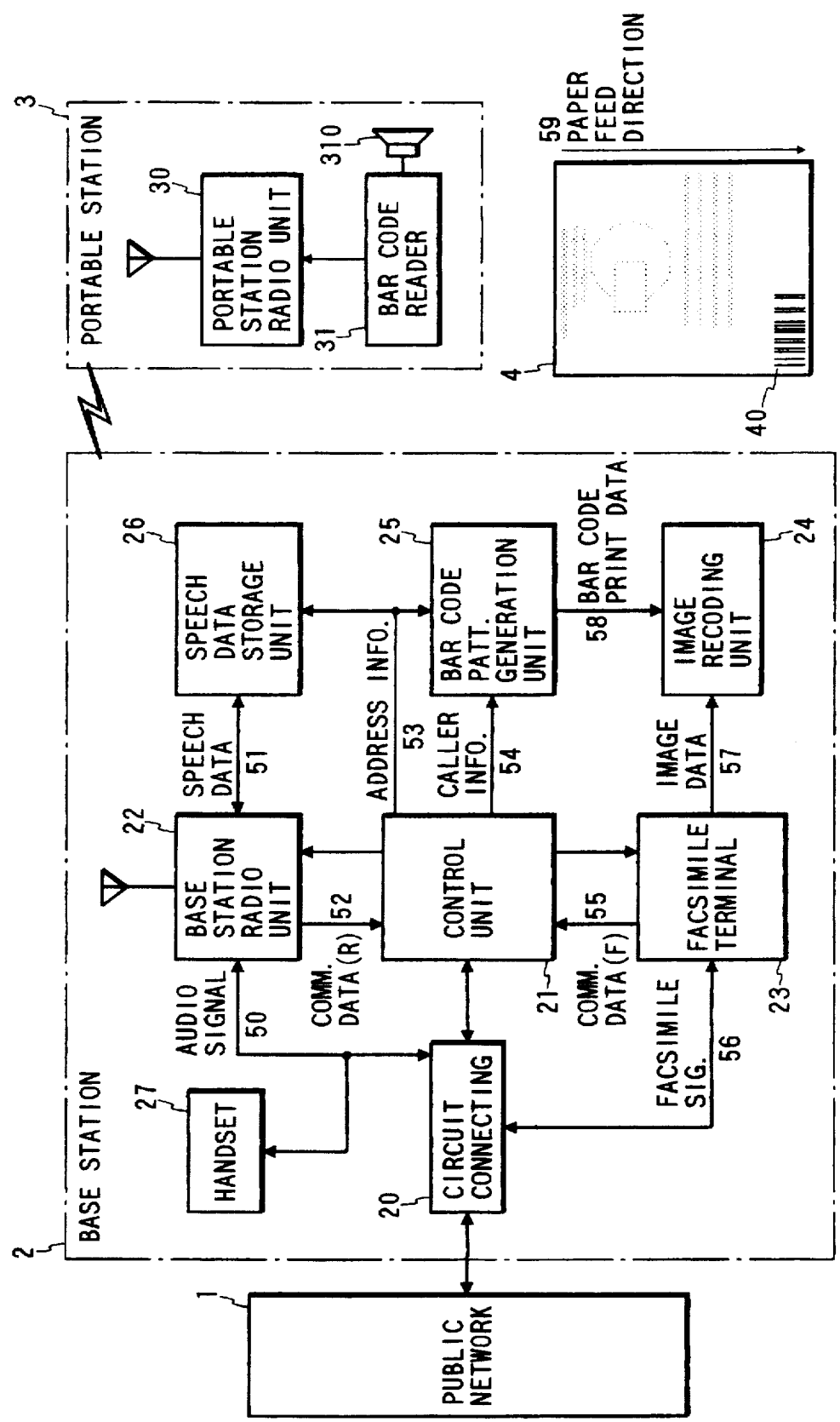
FIG. 1 is a block diagram illustrating a communication apparatus according to an embodiment of the invention.

Referring now to the drawings wherein like reference numerals are utilized to designate like parts, FIG. 1 is a block diagram illustrating a communication apparatus according to an embodiment of the present invention. In the figure, there is shown a public network 1, a base station 2, portable station 3, and a printed facsimile document 4 having a bar code 40 printed thereon.

In the base station 2, there is provided a circuit connecting unit 20, a control unit 21, a base station radio unit 22, a facsimile terminal 23, an image recording unit 24, a bar code pattern generation unit 25, a speech data storage unit 26 and a handset 27. The base station 2 is constituted as a cordless telephone base station.

In the portable station 3, there is provided a portable station radio unit 30, a bar code reader 31 and a bar code alerter 310. The portable station 3 is constituted as a cordless telephone portable set.

The circuit connecting unit 20, the facsimile terminal 23, and the control unit 21 correspond to the voice contact reservation capability based on known technologies that is switched to the registration mode without disconnecting the circuit.

When the public network 1 is connected with the base station 2, a transmission signal is transferred therebetween via the circuit connecting unit 20. The circuit connecting unit 20 is connected with the handset 27 through which operator data is entered. When the operator data is entered, the circuit connecting unit 20 controls calling and call-incoming operations for the public network 1 to output the operator data to a peripheral apparatus as required.

The circuit connecting unit 20 has signal paths for transmitted and received audio signals. To these signal paths, the handset 27 is connected. The circuit connecting unit 20 also has a connection switching capability for connecting either the facsimile terminal 23 or the audio signal paths to the public network 1 according to a control procedure to be described later. The audio signal paths are also connected with the base station radio unit 22.

The base station radio unit 22 performs radio communication with the portable station radio unit 30 located at the other end of the communication line via the radio section interface specified in the second-generation cordless telephone standards (RCR STD-28 issued by the Research and Development Center for Radio Systems Foundation). The audio signal is thus encoded by the adaptive differential pulse coding method (hereinafter referred to as ADPCM) of 32 Kbps and the coded signal is transmitted as a digital phase modulated signal based on speech data. Speech messages are stored in a digital data format by using a speech coder (to be described with reference to FIG. 4) incorporated in the base station radio unit 22. Hence, the input/output signal line for the speech data coming from the base station radio unit 22 is connected to the speech data storage unit 26. The speech data storage unit 26 is composed of a semiconductor memory to reduce the dimensional size of the unit. For example, use of a flash ROM is considered in which a data quantity predetermined for one message to be recorded in the automatic answering mode provides one unit of erase block.

Meanwhile, the facsimile terminal 23 outputs the received image data to the image recording unit 24 via the circuit connecting unit 20 and other communication data (F) to the control unit 21.

The control unit 21 performs overall control of the entire base station 2. More specifically, the control unit controls the facsimile communication and operations such as the associative operation of registration mode and the reproduction of speech messages. For this purpose, in addition to the communication data (F), the operator data from the circuit connecting unit 20 and the communication data (R) received by the base station radio unit 22 via the radio path are entered in the control unit. The control unit 21 has a control output for instructing the circuit connecting unit 20 to perform a calling operation, set a calling number, disconnect the telephone line, and set an internal audio signal path for recording/reproducing a speech message. Also, the control unit has another control output for instructing the base station radio unit 22 to control radio communication operations, set the speech data decoding and coding modes, and set a speech data connecting path. In addition, the control unit has yet another control output for instructing the facsimile terminal 23 to discontinue receive procedure processing.

Further, the control unit 21 outputs storage address data and reproduction address data of speech data to the speech data storage unit 26. These address data are also outputted to the bar code pattern generation block 25, with an identification bit for discriminating between storage and reproduction. Further still, the control unit 21 outputs, to the bar code pattern generation unit 25, calling party information detected based on the received communication data of the facsimile terminal 23. In the present embodiment, this calling party information is specifically a telephone number of the calling party. The bar code pattern generation unit 25 generates data for printing a bar code from the storage address data and the calling party telephone number and outputs the generated data to the image recording unit 25. The image recording unit 25 adds bar code information to the received facsimile image data to print the resultant data in a predetermined format.

Consequently, the recorded image of the facsimile and the speech message recorded in the automatic answer mode can be associated with each other. A schematic diagram illustrating a print example (the facsimile document 4) is shown in FIG. 1. In the present embodiment, bars of the bar code are printed in parallel with the paper feed direction of the image recording unit 24. This setup avoids the degradation of a bar code reading accuracy in which bar code line width and line interval play an important role, the degradation being caused by degradation of the paper feed of the image recording unit 24.

Connected to the base station 2 via the radio path is the portable station 3. Although only a single portable station is depicted in FIG. 1, there may be a plurality of portable stations. The portable station 3 is composed of the portable station radio unit 30 connected with the bar code reader 31 to transmit information read through the bar code reader 31 to the base station 2 as radio communication data.

Figure 2:
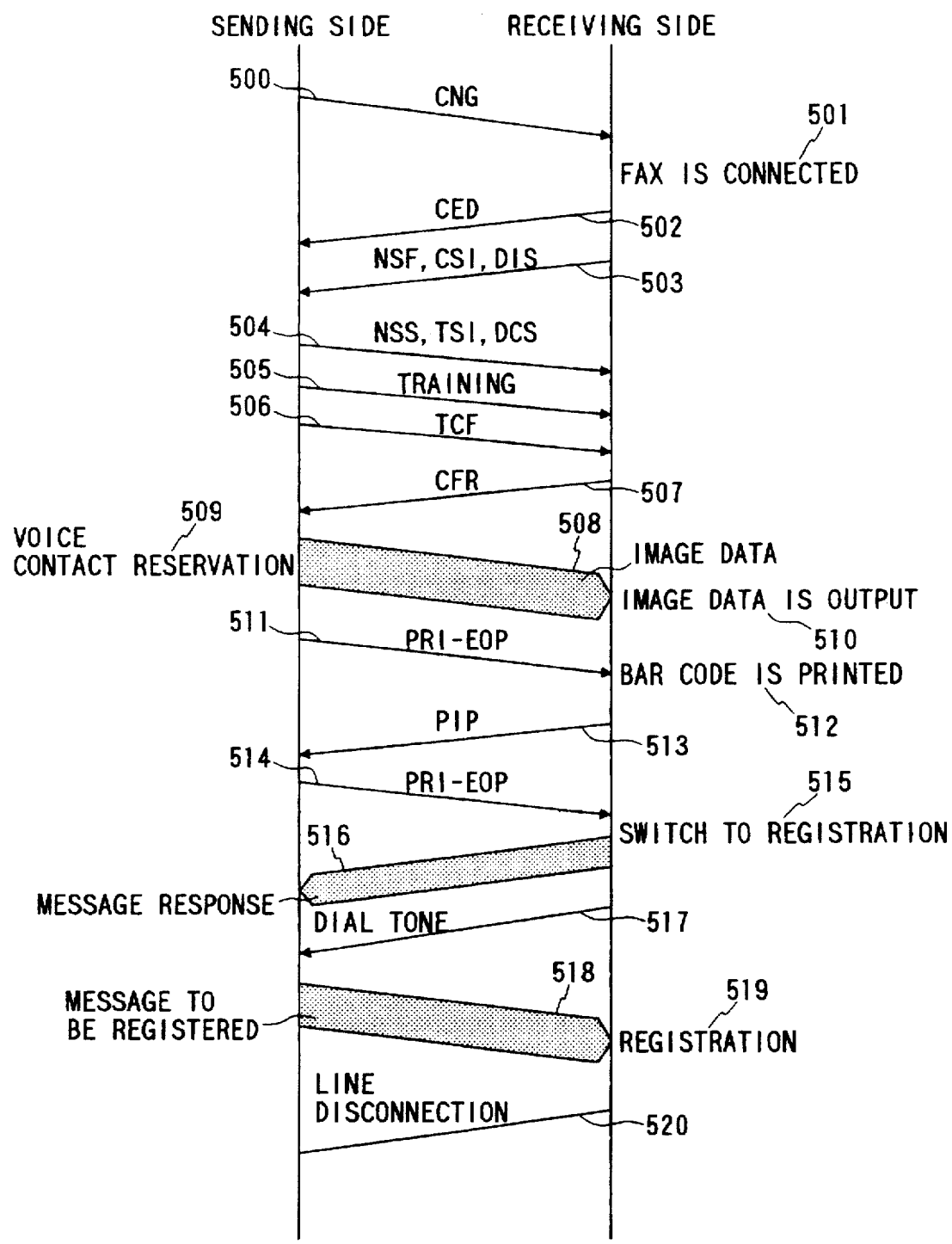
FIG. 2 is a diagram illustrating a communication procedure according to the present invention.

A communication procedure processing from facsimile reception to speech message recording as practiced in the present embodiment is described with reference to FIG. 2 utilizing reference numerals 500 through 520. With an advance setting by the receiving operator (A) through the handset 27, the control unit 21 that has received the operator data has the registration mode set therein. It should be noted that a facsimile terminal on the sending or transmitting side, not shown, has the voice contact reservation capability and can transmit a facsimile and a voice signal in a single call.

Now, it is assumed that the sending or transmitting operator (B) has called the base station 2 of FIG. 1 as the destination of facsimile transmission. As a result, call termination is detected on the circuit connecting unit 20 to set the circuit for the public network 1. Then, a CNG signal (1100 Hz±38 Hz, 0.5 second) for notifying facsimile transmission is transmitted from the transmitting side (step 500).

Upon reception of the CNG signal, the circuit connecting unit 20 connects the facsimile terminal 23 to the public network 1 (step 501). The connected facsimile terminal 23 sends a CED signal to the facsimile on the other end of the line to tell it that the call-incoming terminal is a facsimile terminal (step 502). Then, the preparation for transmission is made by using a binary-coded control signal. Subsequently, nonstandard function (NSF), called side identification (CSI), and digital identification signal (DIS) are sent from the call-incoming facsimile terminal 23 (step 503) to notify the calling facsimile terminal that the processing moves to a non-standard procedure unique to the present embodiment.

In response, a non-standard function setting (NSS), transmitting terminal identification (TSI), and digital command signal (DCS) are sent from the calling facsimile terminal (step 504). Then, following the transmission of a training signal from the calling facsimile terminal (step 505), a training check (TCF) is sent from the calling facsimile terminal (step 506). Next, when the call-incoming facsimile terminal 23 has performed a training operation normally and becomes ready for reception, a confirm ready (CFR) is sent from the called terminal (step 507).

Subsequently, necessary image data is sent (step 508) and the call-incoming facsimile terminal 23 outputs the received image data to the image recording unit 24 (step 510). On the calling side, the calling operator (B) performs voice contact reservation during the facsimile transmission (step 509). As a result of the voice contact reservation, a procedure interruption (PRI-EOI) is sent to keep the line connected after the transmission of image data (step 511).

The control unit 21 that recognized the registration mode by the presetting detects the PRI-EOI via the communication data to output a storage address at which the speech message is to be recorded. From this address information and the calling party information sent at the beginning of the facsimile reception, bar code data is generated to be printed on an image printing paper like the image data (step 512).

Now, in response to the PRI-EOI, the receiving facsimile terminal 23 sends a procedure interruption positive (PIP) (step 513). Upon reception of the PIP, the transmitting facsimile terminal retransmits the PRI-EOI (step 514) and notifies the sending operator (B) with an alarm sound or a buzzer that the voice contact mode is on.

On the receiving side, the control unit 21 detects the PRI-EOI again from the communication data to instruct the circuit connecting unit 20 to switch the connection to the registration mode (step 515). As a result, based on the control by the control unit 21, the connecting unit sets an audio path to be described to send a response message to the calling side (step 516). When the response message is heard by the calling operator (B), the calling operator (B) recognizes that the call-incoming facsimile terminal 23 is not attended by the called operator (A) and, following a dial tone to be sent (step 517), the calling operator (B) enters a speech message (step 518).

The speech message is entered in the speech data storage unit 26 at the storage address therefor (step 519). Upon completion of the above-mentioned series of operations, the control unit 21 instructs the circuit connecting unit 20 to disconnect the line (step 520).

Figure 3:
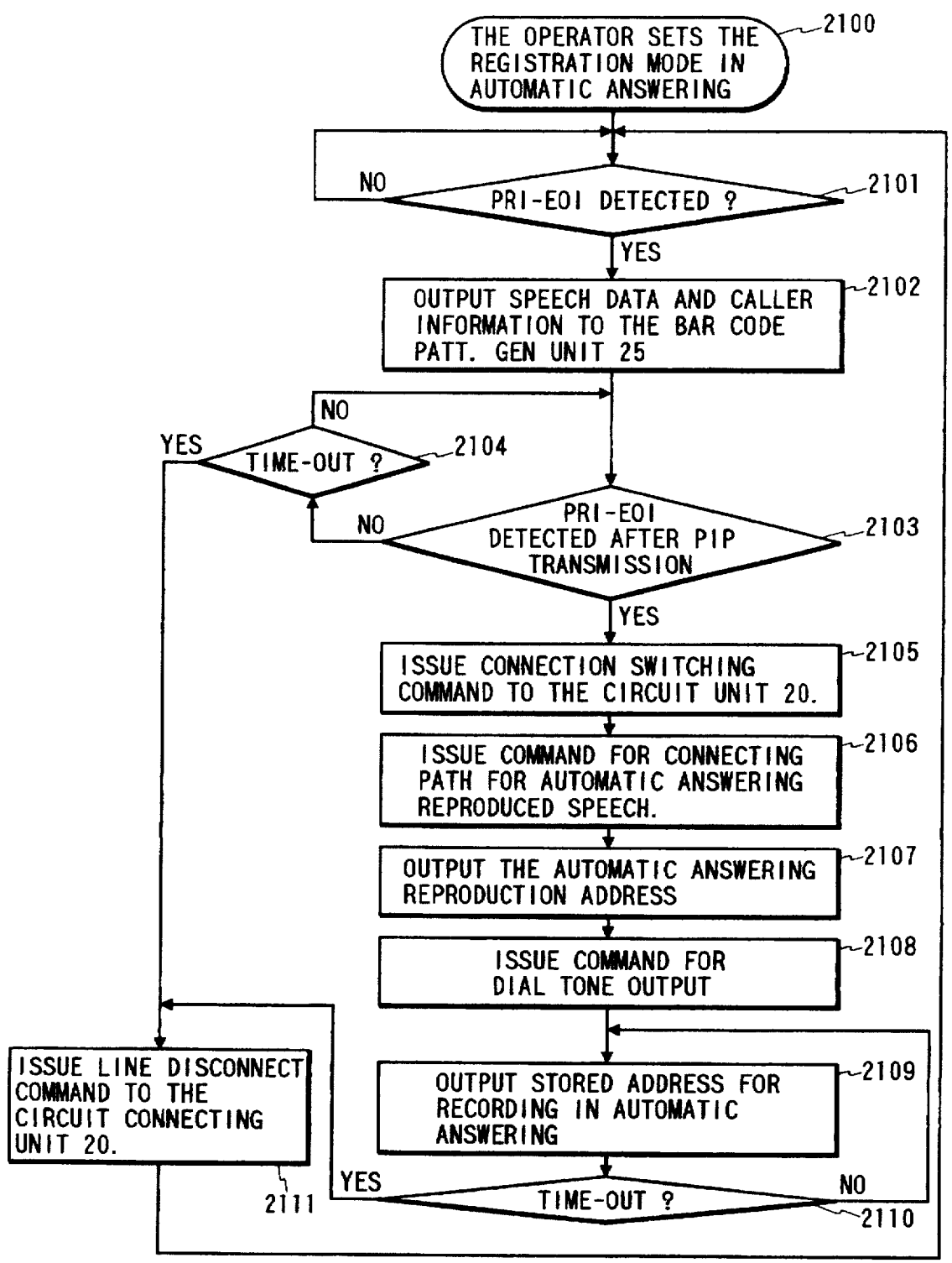
FIG. 3 is a flowchart describing the operations of the control unit of the base station of the present invention.

In the present embodiment, the control unit 21 controls all of the operations as described above. Reorganized operations of the control unit 21 in the registration mode is described with reference to FIG. 3 which shows a flowchart of the processing steps by the control unit 21 in the registration mode, the steps being indicated by reference numerals 2100 through 2111. First, the control unit 21 recognizes the registration mode from the operator data (step 2100) and enters the state in which to monitor the communication data coming from the facsimile terminal 23 (step 2101). When the control unit detects the PRI-EOI from the abovementioned communication data, the control unit outputs the calling party telephone number and the speech data storage address information to print a bar code on the facsimile document (step 2102). Then, after the PIP signal is sent by the facsimile terminal 23, the control unit re-enters the state in which to monitor the PRI-EOI (step 2103). This state is provided with a time-out (step 2104). If the PRI-EOI is not detected within a predetermined time, the control unit instructs the circuit connecting unit to disconnect the line.

When the control unit detects the PRI-EOI again in step 2103, the control unit instructs the circuit connecting unit 20 to switch the line to the registration (step 2105) to connect the audio path for automatic answering message reproduction (step 2106, details to be described later). Then, the control unit outputs the automatic answering message reproduction address followed by the transmission of the automatic answering message (step 2107). After the transmission of the automatic answering message, the control unit instructs the circuit connecting unit to output a dial tone for requesting the recording of the speech message (step 2108), counts a predetermined recording time, and sequentially updates and outputs storage addresses until the time-out is detected (steps 2109 and 2110). Then, when the recording time has passed, the control unit instructs the circuit connecting unit 20 to disconnect the line (step 2111).

An audio path to be set according to the above-mentioned series of control operations is described with reference to FIG. 4 which is a block diagram illustrating the relationship of the base station radio unit 22 with its peripheral devices.

Figure 4:
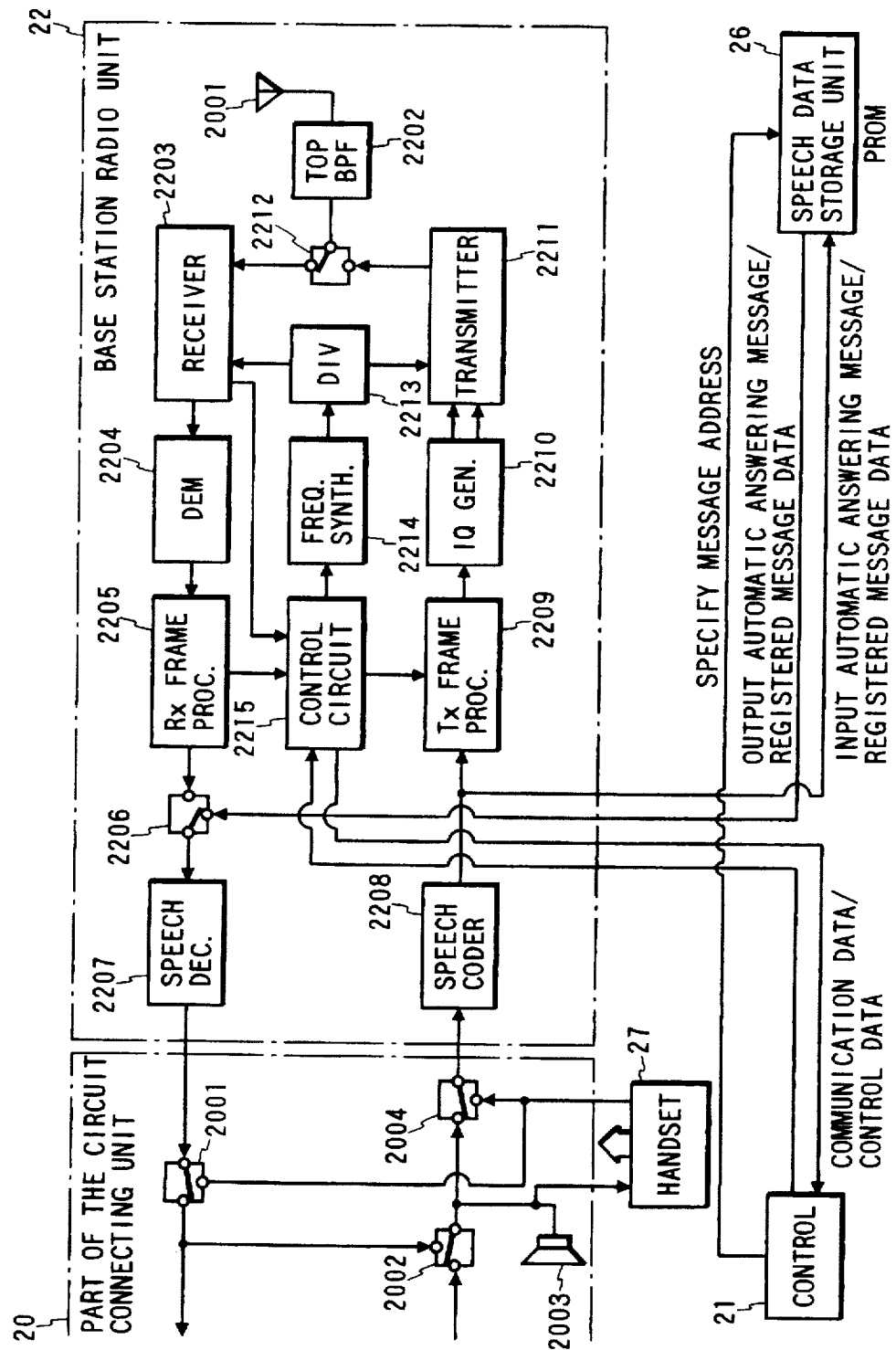
FIG. 4 is a block diagram illustrating the base station radio unit of FIG. 1 and the connection with peripheral devices.

In the circuit connecting unit 20 of FIG. 4, reference numerals 2001, 2002 and 2004 indicate selector switches and reference numeral 2003 indicates a speaker. In the base station radio unit 22, reference numeral 2201 indicates a transmit/receive antenna, reference numeral 2202 a top band-pass filter, 2203 a receiver, 2204 a demodulator, 2205 a receive frame processing circuit, 2206 a selector switch, 2207 a speech decoder, 2208 a speech coder, 2209 a transmit frame processing circuit, 2210 an IQ signal generator, 2211 a transmitter, 2212 a high-frequency switch, 2213 a divider, 2214 a frequency synthesizer, and reference numeral 2215 a control circuit.

As described, the base station radio unit 22 is compatible with the second generation cordless telephone system. Hence, the base station radio uses the TDD-TDMA scheme in which transmission and reception are performed on the same frequency in a time division manner to digital-phase-modulate coded speech data, communication control data and other communication data for communication with the portable station 3.

First, the base station radio unit 22 will be described by following a receive audio signal path. A receive audio signal is entered in the speech coder 2208 to be converted to speech data. For the coding scheme, 32 Kbps ADPCM is used when the base station is used as a cordless telephone base station. For the registration, the data compression ratio is increased and therefore 8 Kbps coding is performed, for example.

The speech data outputted from the speech coder 2208 is entered in the transmit frame processing circuit 2209 and the speech data storage unit 26. In order to transmit the speech data over a time division radio path, the transmit frame processing circuit 2209 performs the processing to incorporate the speech data into a frame of a burst format including a sync word and the like. Non-audio signal communication data and line control data are also supplied to the transmit frame processing circuit 2209 from the control circuit 2215. These data are also provided into the frame of the burst format.

The output from the transmit frame processing circuit 2209 is framed transmit data to be supplied to the IQ signal generator 2210. Based on the transmit data, the IQ signal generator 2210 outputs a two-dimensional vector signal representing a phase transition that follows a predetermined coding rule. Using this vector signal, the transmitter 2211 modulates a high-frequency signal supplied from the divider 2213, power-amplifies the modulated signal, and outputs the amplified signal. The modulated high-frequency signal from the divider 2213 is generated from a communication carrier set by the control circuit 2215 and outputted by the frequency synthesizer 2214. The signal from the frequency synthesizer is divided by the divider 2213 into the transmitter 2211 and the receiver 2203. The modulated output of the transmitter 2211 is supplied to the top band-pass filter 2202 via the high-frequency switch 2212 to be band-limited to a communication channel width. The resultant signal is outputted from the transmit/receive antenna 2201.

Meanwhile, the signal received by the transmit/receive antenna 2201 is supplied to the receiver 2203 via the top band-pass filter 2202 and the high-frequency switch 2212. The IF signal down-converted by the receiver 2203 is supplied to the demodulator 2204 to be demodulated to the received data. The receiver 2203 also provides a receive level signal into the control circuit 2215 for radio path control. The demodulated received data is detected by the receive frame processing circuit 2205 for a frame sync and is processed with such processing as time division timing control. From the received data frame, speech data or other communication data are extracted. The former is supplied to the selector switch 2206 at one input thereof, while the latter is provided in the control circuit 2215. The reproduced data of the speech data storage unit 26 is supplied to the selector switch 2206 at the other input thereof.

Then, either the received speech data or the reproduced speech data is supplied to the speech decoder 2207. The speech decoder 2207 decodes the entered digital coded speech to an analog audio signal to be outputted to the circuit connecting unit 20. At this moment, the speech decoder 2207 operates in two modes so that the decoder performs the 32 Kbps ADPCM decoding for received speech data and the 8 Kbps decoding for decoding reproduced data. These two modes are provided to compress the data amount of each message to be recorded in the speech data storage unit 26, thereby increasing the number of stored speech messages.

The control circuit 2215 incorporated in the base station radio unit 22 can output the received communication data via the interface with the control unit 21 which can instruct the circuit connecting unit 20 to perform a calling operation according to the above-mentioned entered communication data.

A signal path for the audio signal of the circuit connecting unit 20 is now described. The audio signal outputted from the speech decoder 2207 and supplied to the circuit connecting unit 20 is supplied to the selector switch 2001 at one input thereof. The audio signal outputted from the handset 27 is supplied to the selector switch 2001 at the other input thereof. The selector switch 2001 connects the output from the portable station 3 to the public network 1 when effecting speech by using the portable station 3 as a portable set of a cordless telephone and connects the output from the handset 27 to the public network 1 when effecting speech on the base station.

The audio signal selected by the selector switch 2001 is branched to the selector switch 2002 at one input thereof. The received speech coming from the public network 1 is supplied to the selector switch 2002 at the other input thereof. The selector switch 2002 selects one of the two inputs to output the selected input to the selector switch 2004, the speaker 2003, and handset 27. The selector switch 2002 is used to set an audio signal path for performing the 32 Kbps ADPCM again to transfer the 8 Kbps audio signal decoded by the speech decoder 2207 to the portable station 3 when reproducing a stored speech. The selector switch 2004 selects between a received speech signal or reproduced speech signal on the public network 1, which is the output from the selector switch 2002 and the audio signal entered via the handset 27. The selector switch 2004 selects the received speech signal or reproduced speech signal when the portable station 3 requests speech reproduction or at the time of cordless telephone speech or selects the handset 27 when entering an automatic answering message at registration. The selector switch 2004 connects the signal thus selected to the speech coder 2208. The speech coder 2208 operates as the 32 Kbps ADPCM coder except when the automatic answering message is entered as described above.

The above-mentioned arrangement stores and reproduces the automatic answering message and caller speech message in the registration by means of hardware for coding and decoding of the digital second-generation cordless telephone. The automatic answering message may be entered through the handset 27 of the base station 2. Also, the selector switch 2002 is provided to set the path for re-coding a reproduced speech, thereby enabling the separate setting of the coding rate for radio communication and the coding rate for storing speech data in the speech data storage block 26. This setup increases the compression ratio of the speech data to be stored.

Tables 1 through 3 list the settings of the selector switch connections in the circuit connecting unit 20 and the base station radio unit 22. Table 1 lists the settings for recording an automatic answering message. Table 2 lists the settings for the automatic answering mode. Table 3 lists the settings for reproducing a message recorded in the automatic answering mode.

TABLE 1

| Selector switch settings for recording automatic answering message | |
|---|---|
| Code | Connected to |
| 2206 | Dont' care |
| 2001 | Don't care |
| 2002 | Don't care |
| 2004 | Speech output side of handset 27 |

TABLE 2

Selector switch setting for automatic answering mode

| Code | Connected to |
|---|---|
| 2206 | Data output side of speech data storage unit 26 |
| 2001 | Network side, transmit speech signal path |
| 2002 | Network side, receive speech signal path |
| 2004 | Output side of selector switch 2002 |

TABLE 3

Selector switch for reproducing message in automatic answering mode

| Code | Connected to |
|---|---|
| 2206 | Data output side of speech data storage unit 26 |
| 2001 | Network side, transmit speech signal path |
| 2002 | Output side of selector switch 2001 |
| 2004 | Output side of selector switch 2002 |

Figure 5:
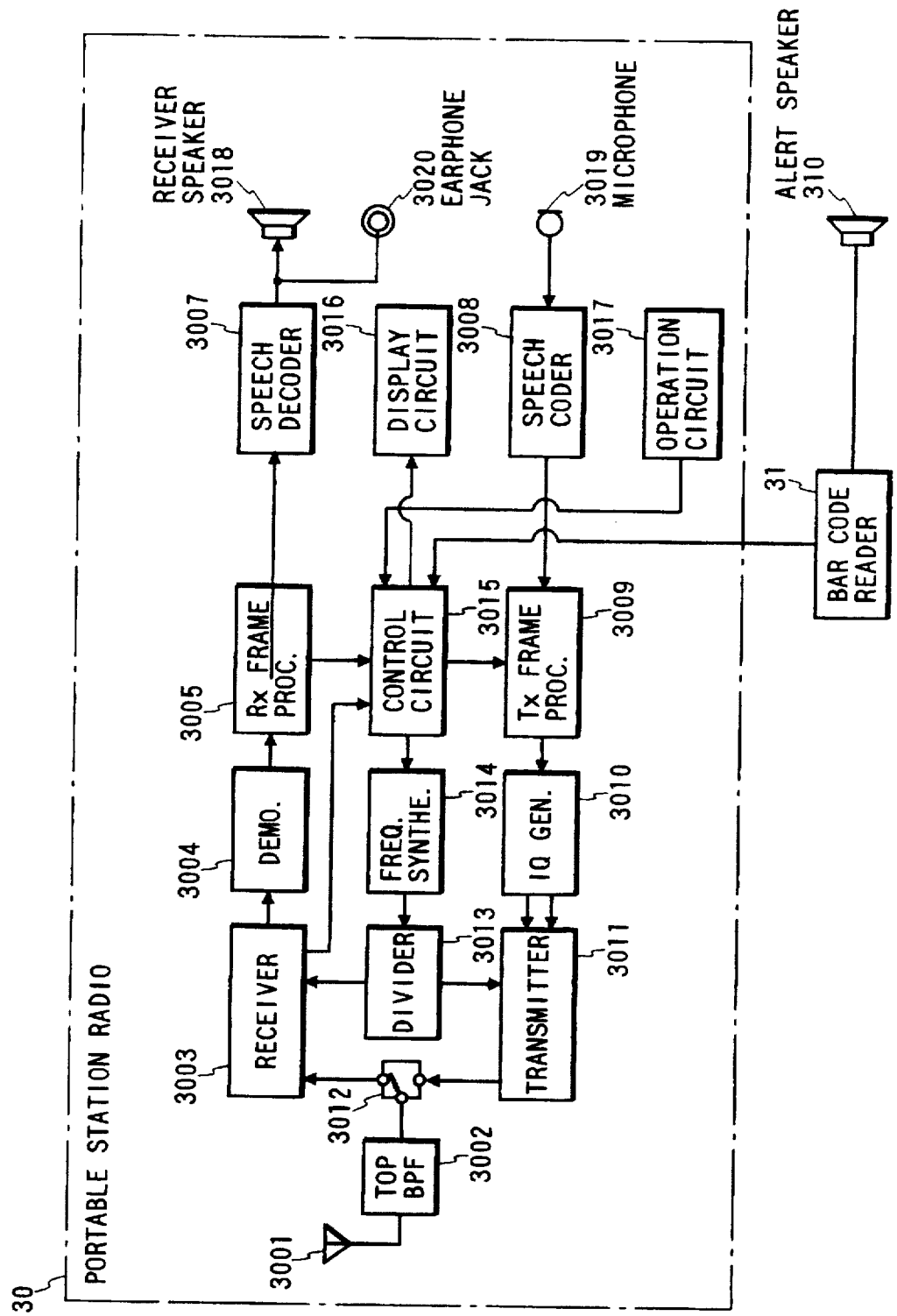
FIG. 5 is a block diagram illustrating the portable station of FIG. 1.

Next, the portable station radio unit 30 of the portable station 3 that is at the other end of the radio path will be described with reference to a block diagram of FIG. 5. In FIG. 5, reference numeral 3001 indicates a transmit/receive antenna, reference numeral 3002 a top band-pass filter, 3003 a receiver, 3004, a decoder, 3005 a receive frame processing circuit, 3007 indicates a speech decoder, 3008 a speech coder, 3009 a transmit frame processing circuit, 3010 an IQ signal generator, 3011 a transmitter, 3012 a high-frequency switch, 3013 a divider, 3014 a frequency synthesizer, and 3015 indicates a control circuit. The operations of these components are the same as those of the components constituting the base station radio unit 22. Reference numeral 3016 indicates a display circuit, reference numeral 3017 indicates an operation circuit, 3018 a receiver speaker, 3019 a microphone, and 3020 indicates an earphone jack. These components 3001 through 3005 and 3007 through 3020 allow the portable station radio unit to operate as a portable station of the cordless telephone. The alert speaker 310 is attached to the bar code reader 31.

The operator can effect calling and other operations via predetermined key entries on the operation circuit 3017. Dial information and other status information are displayed on the display circuit 3016. When the operator makes voice contact, a signal entered through the microphone 3019 is transmitted and a speech signal received and demodulated can be heard through the receiver speaker 3018 or through an ear receiver via the earphone jack 3020.

The bar code reader 31 is connected to the control circuit 3015 and supplies reproduced message address information and calling party telephone number information. The reproduced message address information is transferred to the base station 2. Based on this information, a message concerned is received. The calling party telephone number information is temporarily stored in the control circuit 3015. When an off-hook key to be described is operated on the operation circuit 3017, dial data of the facsimile sender is immediately transferred to the base station 2.

Figure 6:
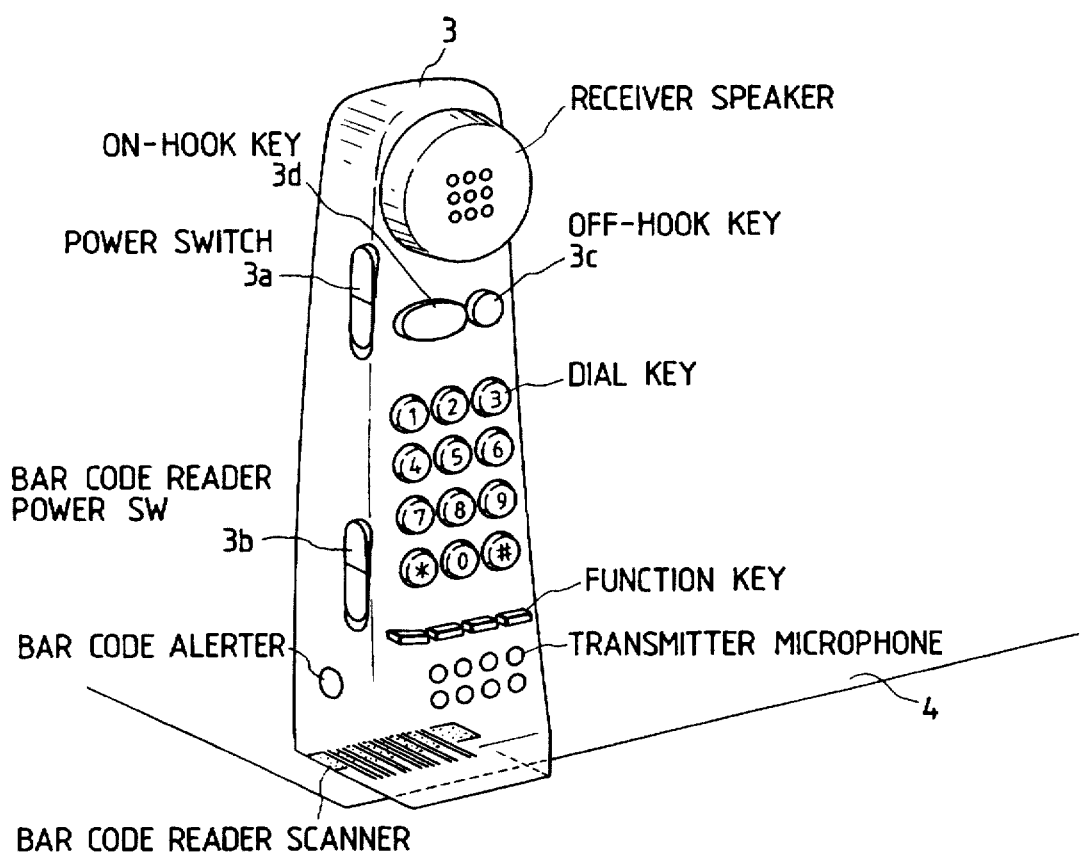
FIG. 6 is a perspective view of an external view of the portable station of the present invention.

Now, referring to FIG. 6, there is shown an example of an external view of the portable station 3. In the portable station, the portable station radio unit 30 and the bar code reader 31 are integrated in one unit and the bar code reader 31 is located under a casing of the bar code reader, thereby implementing ease of operation. In addition to a power switch 3a, another power switch 3b dedicated to the bar code reader 31 is provided. The power switch 3b is turned off to save the battery-driven bar code reader when it is not in use. When a bar code is entered, a reproduced message is immediately outputted. When the off-hook key 3c is pressed in this state, dialing to a number read from the bar code is automatically performed. In FIG. 6, reference numeral 3d indicates an on-hook key. In addition, the portable station 3 is provided on the outside thereof with components identified as shown in FIG. 6.

Figure 7:
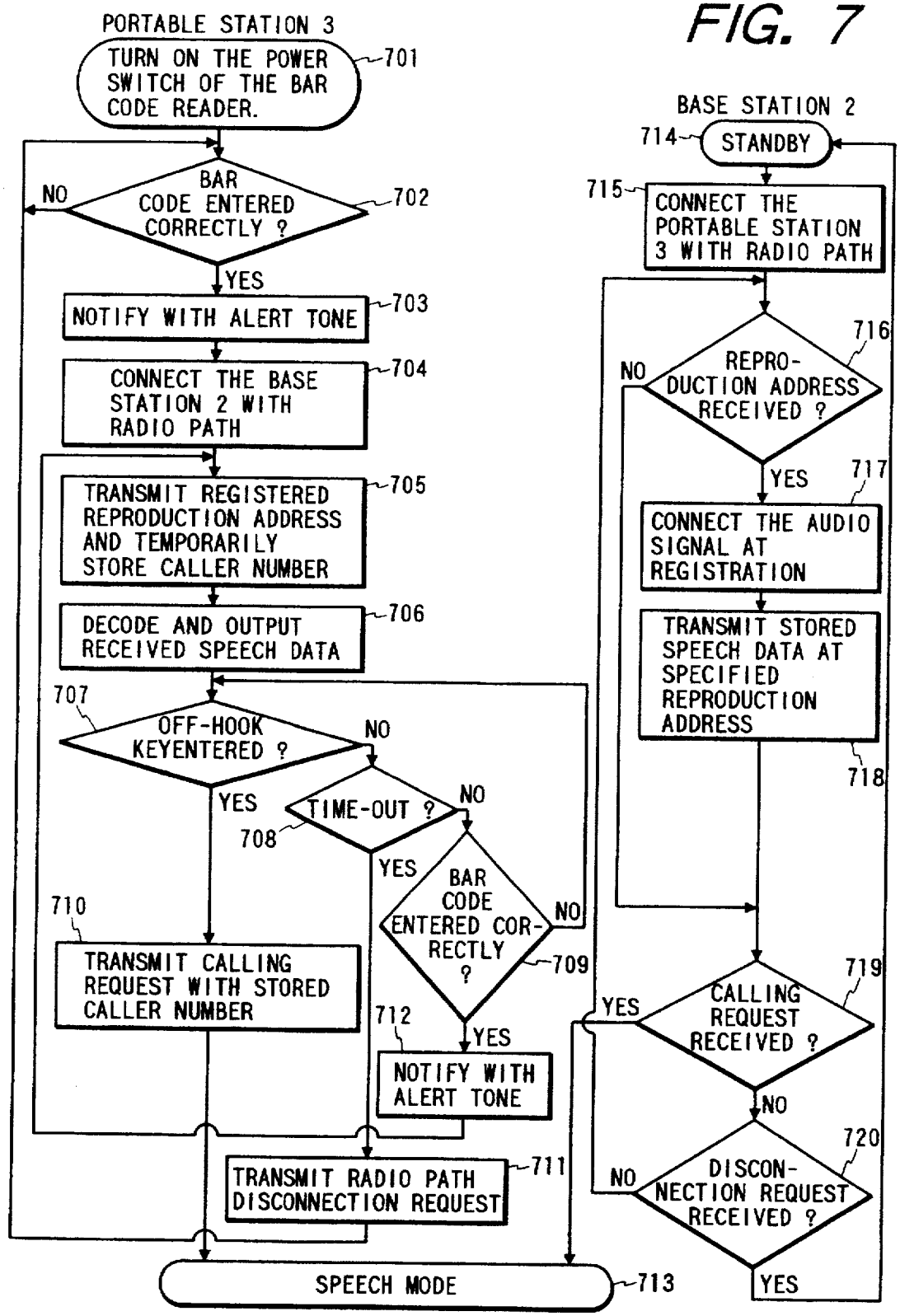
FIG. 7 is a flowchart describing the operations of the portable station and the base station at registration in accordance with the present invention.

The flow of operations to be performed at reproduction of a recorded message is described by reference to a flowchart of FIG. 7, wherein processing steps 701 through 712 indicate operations of the portable station 3 respectively, processing steps 714 through 720 indicate operations of the base station 2 respectively, and processing step 713 indicates a speech mode operation different from the recorded message reproducing operations.

First, the operations of the portable station 3 will be described. To hear a speech message, the operator of the portable station 3 turns on the bar code power switch 3b and the power switch 3a (step 701) to start bar code reading operation (step 702). The reading operation is repeated until a bar code is read correctly (each bar code is attached with a check code at generation of each bar code). When the bar code has been read correctly, the operator is notified thereof with an alert tone (step 703). Subsequently, the radio path is connected with the base station 2 (step 704). Then, of the information read, a reproduction address information for a message recorded in automatic answering is transmitted to the base station 2 and a calling party telephone number is stored in the control circuit 3015 (step 705). As a result, the reproduced speech message is transmitted from the base station 2. The portable station radio block 30 connects a received speech path to output the decoded speech reproduction (step 706).

When the above-mentioned reproduction output has been completed, the operator of the portable station 3 presses the off-hook key (step 707), waits until a predetermined time passes (step 708) or enters the bar code again (step 709). When the bar code has been entered correctly again, the operator is notified thereof with an alert tone (step 712), upon which the processing goes back to step 705. If a time-out occurs, a request for disconnecting the radio path is transmitted (step 711) and the path with the base station 2 is discarded, upon which the processing goes back to step 702.

Meanwhile, if the operator of the portable station 3 selects to press the off-hook key 3c within the predetermined time, calling to a telephone number stored in the control circuit 3015 is performed on the radio path in connection (step 710) and the processing moves to the cordless telephone speech mode (step 713).

Normally, the speech mode terminates when the on-hook key 3d is pressed. This processing flow makes it unnecessary to redo the setting of the radio path every time a recorded speech message is reproduced, resulting in a prompt speech message reproduction. Moreover, the reproduction can be made simply by entering the bar code again. In addition, call-back contact for a confirmation call, gratitude call or the like for the recorded speech message can be made only by pressing the off-hook key 3c, thus saving the dialing for a calling operation.

The operations of the base station 2 associated with above-mentioned processing is now described. First, the base station 2 is in a standby state (step 714). When, in this state, the base station receives a connection request from the portable station 3, the base station sets a radio path for communication data (step 715) and enters a state in which to receive the communication data including the reproduction address of a speech message (step 716). Upon reception of the address information, the base station recognizes message reproduction, sets a path for stored speech reproduction listed in Table 3 (step 717), and transmits the speech message again (step 718). When the message transmission has been completed, the base station determines whether to receive calling request (step 719) or receive a disconnection request (step 720). If the base station receives the calling request, the base station enters the speech mode (step 713) and if the base station receives the disconnection request, the base station goes back to the standby state of step 714.

As described above, only the printed facsimile document 4 associated with the message and the portable station 3 are required for obtaining a speech message. If the message is highly confidential, having only the facsimile document 4 and the portable station 3 permits the interception of the speech message.

The present invention solves the above-mentioned intercepting problem, by utilizing a password to enable acquiring of a speech message. First, if a facsimile to be sent is highly confidential, the sending party of such a facsimile document selects a recording mode (hereinafter referred to as a confidential mode) for prohibiting unauthorized parties from accessing the message and instructs a number for specifying the receiving party in a tone signal. Such operations are performed (not shown) after the voice contact reservation in step 509 of FIG. 2. Upon detecting the above-mentioned tone signal, the receive side of the message prints information in addition to the message recording address information in step 512 in which the bar code is printed. Namely, the additional information includes a confidential code indicating the confidential mode and the password registered in the base station 2 for the specified destination, which information are printed along with the message recording address information and the like as bar coded data.

Figure 8:
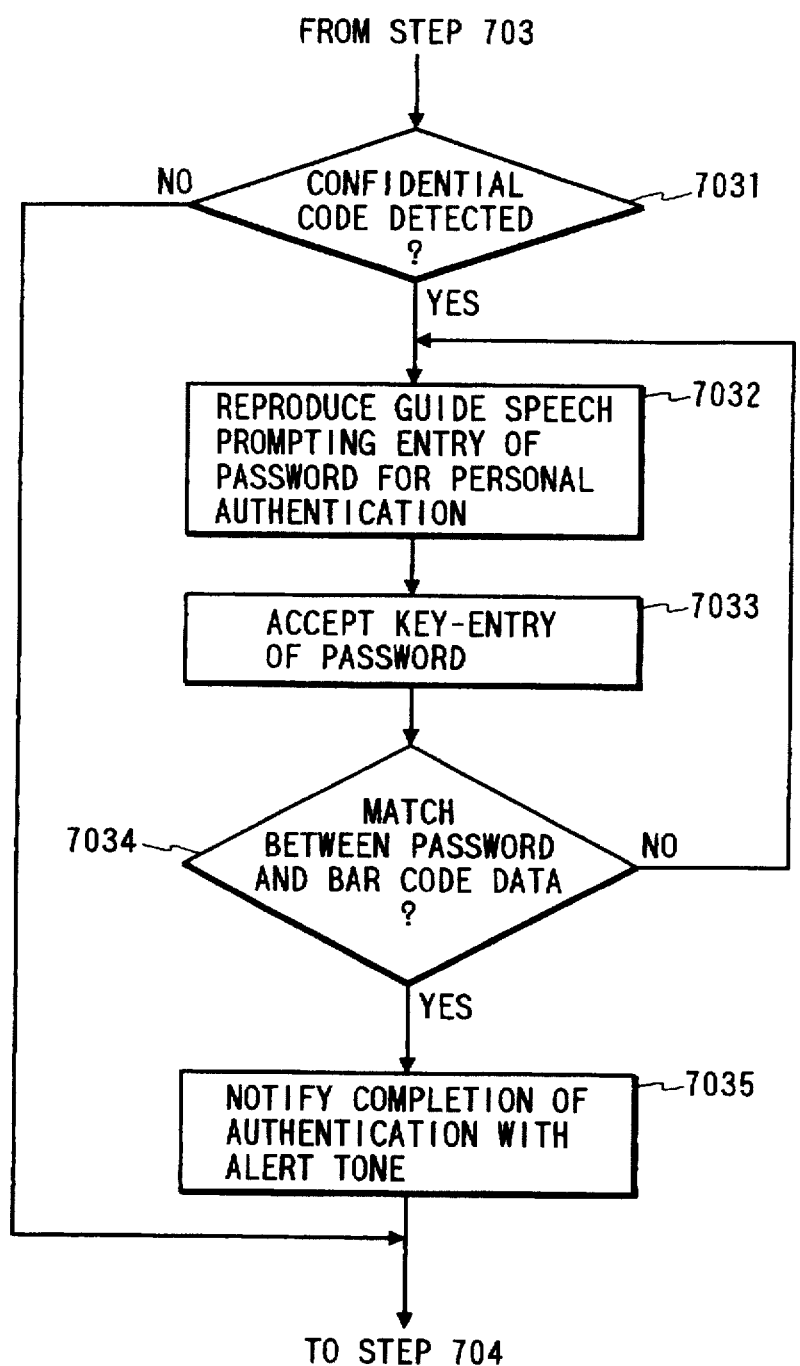
FIG. 8 is a flowchart describing the operation of a confidential communication for use in conjunction with FIG. 7.

Then, the message recorded in the confidential mode is reproduced as follows. FIG. 8 shows a part of the operational flow of the reproducing operation of the portable station 3 of this embodiment which operation is inserted between steps 703 and 704 of the flowchart of FIG. 7, the other steps being the same as those of FIG. 7.

When the normal entry of the bar code is detected by the portable station 3 (step 702), the operator is notified of the normal entry (step 703), followed by the detection of the confidential code as shown in FIG. 8 (step 7031). If the confidential code is not detected, the processing goes to step 704 in which the reproducing operation of the conventional embodiment is carried out. If the confidential code is detected, a guide speech stored in the portable station 3 is reproduced (step 7032). This guide speech may be "This message is protected: enter your password", for example.

Figure 9:
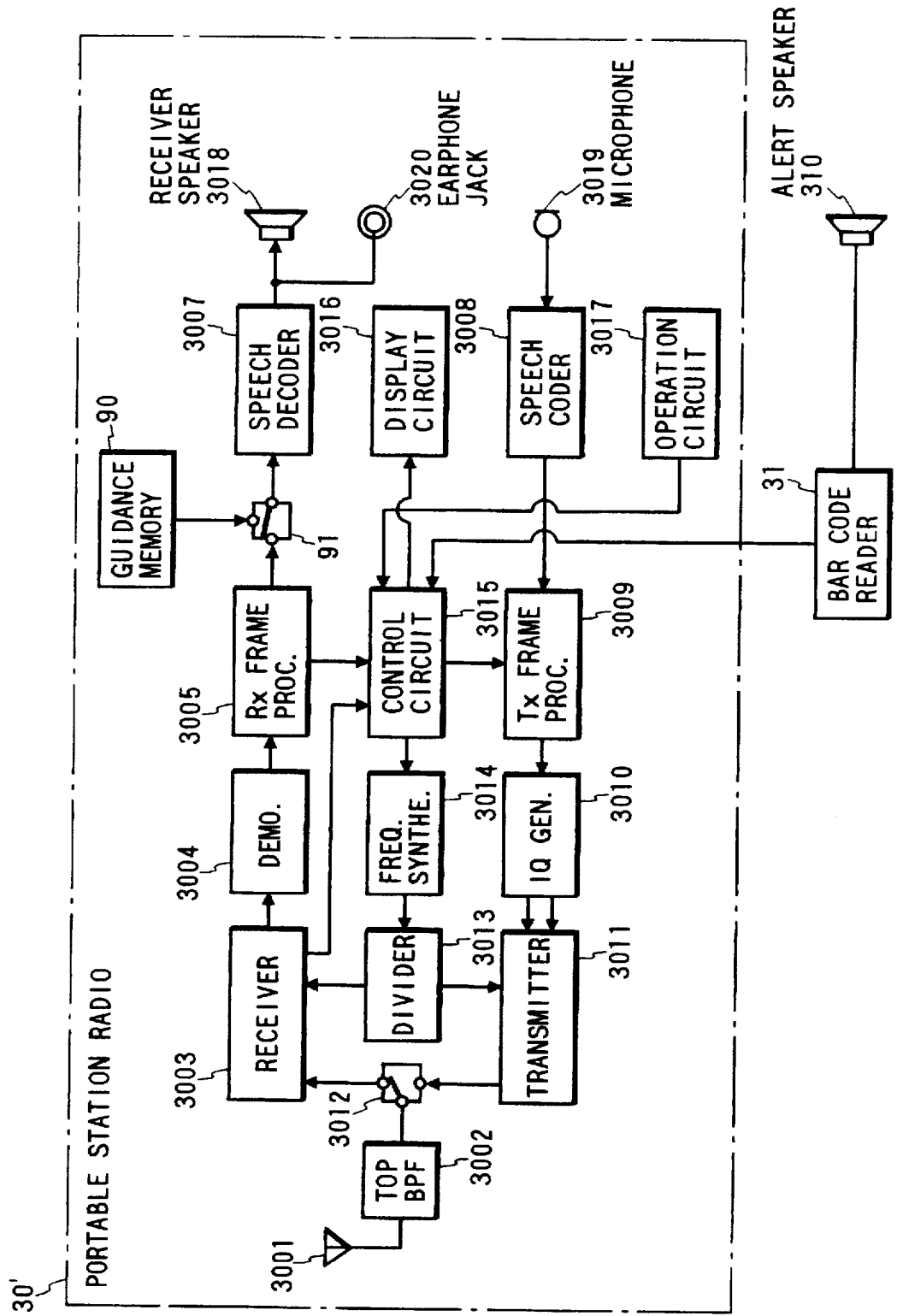
FIG. 9 is a block diagram of a portable station in accordance with another embodiment of the present invention enabling confidential communication.

The guide speech data may be stored in the digital form compressed by the coding algorithm of the speech coder 3019 shown in FIG. 5. A portable station radio unit provided with the guide speech reproducing path is indicated by reference numeral 30' in FIG. 9. In FIG. 9, reference numeral 90 indicates a memory for storing the guide speech. A switching circuit 91 is controlled by the control circuit 3015 such that the memory 90 is selected at guide speech reproduction and the receive frame processing circuit 3005 is selected at other times.

Now, the operator enters the password in response to the guide speech (step 7033). The password from the portable station and the password read from the bar code is compared to determine a match (step 7034). If a match is found, the portable station 3 indicates the completion of the authentication with alert tone (step 7035) to go to the next step of connecting the radio path with the base station 2. If the match is not found, the processing goes back to step 7032. Thus, the above-mentioned operational flow of the invention prevents any unauthorized person from accessing the messages.

As described above and according to the present invention, speech message storage information can be attached in an optically readable form to a received facsimile image when the image is recorded to be outputted. Reproduction of a stored message is activated by a simple operation of detecting the attached address information by the optical reading means. By hearing the speech message returned by the speech data storage unit via the radio path, the message can be remotely obtained from the facsimile terminal without locational restrictions. Consequently, the speech message can be reproduced repeatedly with the simple operation and the confidentiality of communication is secured, thereby making the present invention preferable for household application.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A speech message recording and reproducing method comprising the steps of:

storing a speech message associated with a facsimile transmission in a communication apparatus having an automatic answering telephone operatively associated with a facsimile apparatus;

converting information of the speech message including at least a storage address of the speech message to an optical pattern for printing on a recording paper;

optically detecting and interpreting at least the printed optical pattern information of the storage address by an another apparatus;

transmitting from the other apparatus the optically detected and interpreted information to the communication apparatus; and receiving from the communication apparatus the speech message stored at the storage address included in the information transmitted to the communication apparatus so as to obtain the reproduced speech message at the other apparatus.

2. A speech message recording and reproducing method according to claim 1, wherein the step of transmitting by the other apparatus the information to the communication apparatus includes utilizing a portable telephone unit for radio communication with the communication apparatus.

3. A speech message recording and reproducing method according to claim 2, wherein the optical pattern indicative of the speech message includes identification information requiring response by a predetermined password to enable reproduction of the speech message.

4. A speech message recording and reproducing method according to claim 2, wherein the optical pattern printed on the recording paper is a bar code.

5. A speech message recording and reproducing method according to claim 2, utilizing a communication apparatus comprising:

facsimile communication means for outputting received image data and other communication data;

first hand set means having a transmitter microphone and a receiver speaker;

speech data storage means for storing at least one of an audio signal and coded speech data according to a specified address information, the stored information being outputted for a specified address;

circuit connecting means for accepting operator entered data, distributing the operated entered data to peripheral means in accordance with requirements therefor, performing calling and call-incoming control on a network, including a transmitter path and a receiver path for at least one of the audio and coded speech data, connecting the first hand set means to the transmitter path and the receiver path, and selecting one of the facsimile communication means and one of the paths for connection to the network;

first radio communication means for communicating a first audio signal passing the path connected to the network, at least one of a second audio signal and speech data outputted from a speech data storage means and the other communication data with an apparatus located at another end of a radio path;

control means for receiving communication data from the facsimile communication means and communication data from the apparatus located at the other end of the radio path via first radio communication means, instructing the circuit connecting means to perform a connection switching operation and a line disconnecting operation, setting an audio path for recording in automatic answering, and outputting at least one of recording and reproducing address information to the speech data storage means;

optical pattern data generation means for receiving the address information, converting the received address information to optically readable facsimile print data, and outputting the converted data; and image recording means for receiving the converted data from the optical pattern data generation means and the image data from the facsimile communication means and printing both the image data and the converted data on a recording paper in a predetermined format;

the facsimile communication means, the first hand set means, the speech data storage means, the circuit connecting means, the first radio communications means, the control means, the optical pattern data generation means and the image recording means forming a base station means for connection with the network;

at least one portable station means at an other end of a radio path for communication with the base station means, the portable station means comprising second hand set means, second radio communications means for transmitting and receiving at least one of the audio signal, the speech data and other communication data, and optical reading means connected to the second radio communication means for optical detecting and interpreting the printed optical pattern on the recording and for converting the detected and interpreted optical pattern to communication data so as to enable reproduction of the speech message.

6. A speech message recording and reproducing method according to claim 5, wherein connection of the radio path set at reproduction of the speech message between the first and second radio communication means is maintained for a predetermined time after the reproduction.

7. A speech message recording and reproducing method according to claim 6, wherein upon further optical detection and interpretation of the same printed optical pattern by the optical reading means, the reproduction of the speech message is repeated.

8. A communication apparatus comprising:

facsimile communication means for outputting received image data and other communication data;

first hand set means having a transmitter microphone and a receiver speaker;

speech data storage means for storing at least one of an audio signal and coded speech data of a speech message according to a specified address information, the stored information being outputted for a specified address;

circuit connecting means for accepting operator entered data, distributing the operated entered data to peripheral means in accordance with requirements therefor, performing calling and call-incoming control on a network, including a transmitter path and a receiver path for at least one of the audio and coded speech data, connecting the first hand set means to the transmitter path and the receiver path, and selecting one of the facsimile communication means and one of the paths for connection to the network;

first radio communication means for communicating a first audio signal passing the path connected to the network, at least one of a second audio signal and speech data outputted from a speed data storage means and the other communication data with an apparatus located at another end of a radio path;

control means for receiving communication data from the facsimile communication means and communication data from the apparatus located at the other end of the radio path via first radio communication means, instructing the circuit connecting means to perform a connection switching operation and a line disconnecting operation, setting an audio path for recording in automatic answering, and outputting at least one of recording and reproducing address information to the speech data storage means;

optical pattern data generation means for receiving the address information, converting the received address information to optically readable facsimile print data, and outputting the converted data; and image recording means for receiving the converted data from the optical pattern data generation means and the image data from the facsimile communication means and printing both the image data and the converted data in an optical pattern in a predetermined format on a recording paper;

the facsimile communication means, the first hand set means, the speech data storage means, the circuit connecting means, the first radio communications means, the control means, the optical pattern data generation means and the image recording means forming a base station means for connection with the network; and at least one portable station means at an other end of a radio path for communication with the base station means, the portable station means comprising second hand set means, second radio communications means for transmitting and receiving at least one of the audio signal, the speech data and other communication data, an optical reading means connected to the second radio communication means, the optical reading means enabling detection and interpretation of the printed optical pattern for converting the detected and interpreted optical pattern to communication data for enabling reproduction of the speech message.

9. A communication apparatus according to claim 8, wherein the optical reading means optically reads the printed optical pattern printed on the recording paper for detecting and interpreting at least storage address information and communicating the detected and interpreted storage address information to the communication apparatus to enable reproduction of the speech message.

10. A communication apparatus according to claim 9, wherein the optically readable facsimile print data includes identification information for identifying a called party and requiring password information in response thereto to enable reproduction of the speech message.

11. A communication apparatus according to claim 9, wherein the control means outputs caller information detected from the communication data from the facsimile communication means, and the optical pattern data generation means converts and outputs the caller information.

12. A communication apparatus according to claim 11, wherein a calling operation for a telephone number detected by the optical reading means is initiated by keying a speech request to the second radio communication means.

13. A communication apparatus according to claim 9, wherein a coding bit rate for speech data for storage in the speech data storage means and a coding bit rate for speech data for communication by the first and second radio communication means are different.

14. A communication apparatus according to claim 10, wherein the optical pattern data generation means outputs print data of a bar code.

15. A communication apparatus according to claim 14, wherein the image recording means effects printing in which a recording paper feed direction extends in a direction parallel with each bar of the bar code.

* * * * *